(12) United States Patent
Shah et al.

(10) Patent No.: US 8,078,873 B2
(45) Date of Patent: Dec. 13, 2011

(54) TWO-WAY AUTHENTICATION BETWEEN TWO COMMUNICATION ENDPOINTS USING A ONE-WAY OUT-OF-BAND (OOB) CHANNEL

(75) Inventors: Rahul C. Shah, San Francisco, CA (US); Mark D. Yarvis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 580 days.

(21) Appl. No.: 12/164,362

(22) Filed: Jun. 30, 2008

(65) Prior Publication Data

US 2009/0327724 A1 Dec. 31, 2009

(51) Int. Cl.
*H04L 9/32* (2006.01)
*H04L 29/06* (2006.01)
*H04K 1/00* (2006.01)
*G04F 7/04* (2006.01)

(52) U.S. Cl. ........ 713/169; 713/150; 713/168; 713/170; 713/171; 380/255; 380/270; 380/281; 380/283; 726/2; 726/3; 726/4

(58) Field of Classification Search .................. 713/150, 713/168–171; 380/255, 270, 281, 283; 726/2–4; 725/32, 85, 87, 122
See application file for complete search history.

(56) References Cited

U.S. PATENT DOCUMENTS

| | | | | |
|---|---|---|---|---|
| 6,069,957 | A * | 5/2000 | Richards | 380/281 |
| 7,551,577 | B2 * | 6/2009 | McRae | 370/328 |
| 7,804,890 | B2 * | 9/2010 | Navada et al. | 375/226 |
| 7,831,997 | B2 * | 11/2010 | Eldar et al. | 726/3 |
| 2003/0149874 | A1 | 8/2003 | Balfanz et al. | |
| 2003/0200548 | A1 * | 10/2003 | Baran et al. | 725/90 |
| 2004/0181811 | A1 * | 9/2004 | Rakib | 725/122 |
| 2005/0044363 | A1 * | 2/2005 | Zimmer et al. | 713/170 |
| 2005/0262284 | A1 * | 11/2005 | Cherukuri et al. | 710/307 |
| 2006/0053276 | A1 * | 3/2006 | Lortz et al. | 713/2 |
| 2006/0059367 | A1 * | 3/2006 | Yarvis | 713/189 |
| 2006/0095967 | A1 * | 5/2006 | Durham et al. | 726/23 |
| 2006/0145133 | A1 * | 7/2006 | Komarla et al. | 257/1 |

(Continued)

FOREIGN PATENT DOCUMENTS

KR 10-2006-0111824 A1 10/2006

OTHER PUBLICATIONS

International Search Report and Written Opinion received for PCT application No. PCT/US2009/047699, mailed on Dec. 30, 2009, 10 pages.

*Primary Examiner* — Philip Chea
(74) *Attorney, Agent, or Firm* — Jordan IP Law, PC

(57) ABSTRACT

Techniques for two-way authentication between two communication endpoints (e.g., two devices) using a one-way out-of-band (OOB) channel are presented. Here, in embodiments, both communication endpoints may be securely authenticated as long as the one-way OOB channel is tamper-proof. Embodiments of the invention do not require the one-way OOB channel to be private to ensure that both endpoints are securely authenticated. Since providing a two-way or private OOB channel adds to the cost of a platform, embodiments of the invention provide for a simple and secure method for two-way authentication that uses only a non-private one-way OOB channel and thus helping to reduce platform cost. Other embodiments may be described and claimed.

20 Claims, 6 Drawing Sheets

300

U.S. PATENT DOCUMENTS

| | | |
|---|---|---|
| 2007/0079113 A1* | 4/2007 | Kulkarni et al. ............. 713/150 |
| 2007/0186237 A1* | 8/2007 | Takatori ......................... 725/32 |
| 2008/0092181 A1* | 4/2008 | Britt .............................. 725/87 |
| 2008/0102793 A1 | 5/2008 | Ananthanarayanan et al. |
| 2008/0244257 A1* | 10/2008 | Vaid et al. ........................ 713/2 |
| 2009/0167486 A1* | 7/2009 | Shah et al. ..................... 340/5.2 |

* cited by examiner

TWO-WAY AUTHENTICATION BETWEEN TWO COMMUNICATION ENDPOINTS USING A ONE-WAY OUT-OF-BAND (OOB) CHANNEL

BACKGROUND

Portable computing devices are quickly gaining popularity in part due to their ease of mobility. Secure association of two devices, also known as device pairing, may be an important component of network security for mobile computing devices. Secure association generally involves the secure exchange of cryptographic information between two devices so that they are able to communicate securely over insecure communication channels. For example, some wireless headsets may be securely paired with a phone so that the communication between them is secure.

Some current implementations may allow for exchange of cryptographic keys between two devices over insecure wireless channels such that no eavesdropper may decode the cryptographic information (for example, the Diffie-Hellman protocol). However, the Diffie-Hellman protocol is susceptible to a man-in-the-middle attack in which each of the two devices wishing to pair may instead associate with a third device (i.e., the man-in-the-middle attacker) without realizing it. One approach that may prevent this type of attack uses an out-of-band (OOB) channel to authenticate the devices involved in the Diffie-Hellman exchange with each other. An OOB channel generally refers to a mechanism for sending and/or receiving information to/from another device without using the main communication channel. For example, common OOB channels may include Near Field Communications (NFC), or the entry of a password on both devices (which is then verified as being the same on both ends), or the display of a password on one device that needs to be entered on the other device.

One basic requirement of these OOB channels can be that they involve a human to verify whether the two devices that wish to pair are legitimate devices and then use the human to complete the authentication process. So in the case of NFC, for example, a person may have to bring the two devices within NFC communication range (which may be a few centimeters in some current implementations), while in the case of the password entry, the person actually enters the same password on both devices.

One limitation of OOB channels is that many allow only one-way communication due to size and/or cost constraints. For example, in the case of NFC, data is typically allowed to flow from a first device (e.g., tag device) to a second device (e.g., reader device). Hence, the channel is effectively unidirectional. In such cases, common device pairing standards (e.g., WiFi Protected Setup and Bluetooth Simple Pairing) stipulate that one of the devices send some information (e.g, secret) over the OOB channel and use knowledge of that information for authentication purposes. However, the OOB channel is not necessarily private and hence an eavesdropper (or man-in-the-middle attacker) could potentially obtain the secret over the OOB channel and masquerade as the second device. Here, only the first device gets authenticated and not the second device. Effectively, this means that only one-way authentication occurs, which means that a man-in-the-middle attack still remains possible for one direction of the communication.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
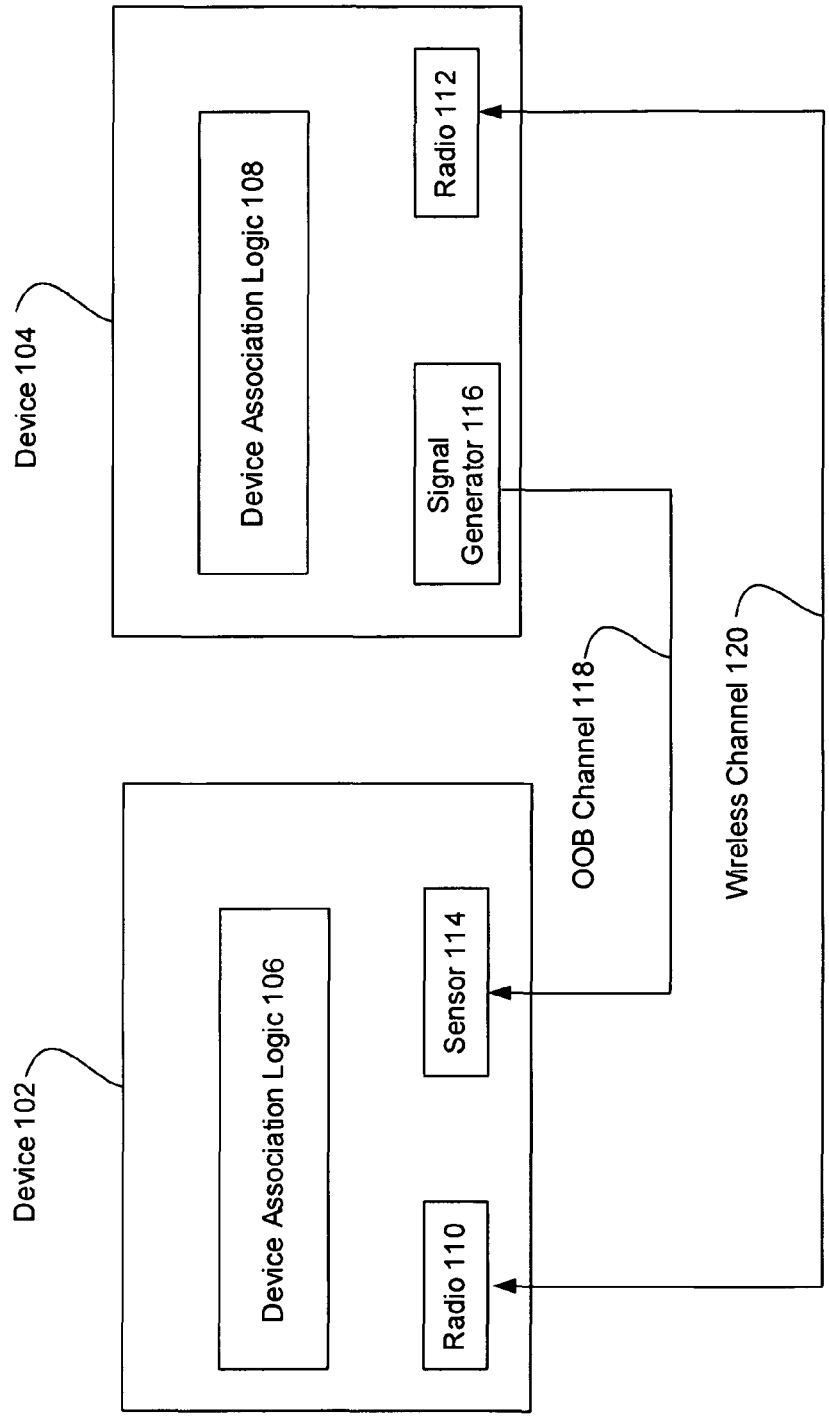
FIG. 1 illustrates an embodiment of a system.

Various embodiments may be generally directed to techniques for two-way authentication between two communication endpoints (e.g., two devices) using a one-way out-of-band (OOB) channel. Here, in embodiments, both communication endpoints may be securely authenticated as long as the one-way OOB channel is tamper-proof. Embodiments of the invention do not require the one-way OOB channel to be private to ensure that both endpoints are securely authenticated. Since providing a two-way or private OOB channel adds to the cost of a platform, embodiments of the invention provide for a simple and secure method for two-way authentication that uses only a non-private, tamper-proof, one-way OOB channel and thus helping to reduce platform cost. Other embodiments may be described and claimed.

Embodiments of the invention described herein may refer to the communication endpoints as devices. This is not meant to limit the invention and is provided for illustration purposes only.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may provide techniques for secure association or authentication of devices. In an embodiment, devices capable of communicating via a wireless channel may be authenticated via a different channel established by one or more signal generators (such as actuators) and/or sensors (such as accelerometers capable of sensing motion in one or more axis) present on the devices. In one embodiment, the signal generators and/or the sensors may be analog.

In an embodiment, a sensor and signal generator pair (which may be present on two mobile computing devices) may be used as an out of band (OOB) communication channel. For example, a first device (such as a mobile phone) may include a vibration feature (e.g., used as the signal generator) which may be combined with an accelerometer (e.g., used as the sensor) on a second device to form a secure OOB channel between the phone and the second device.

Moreover, techniques discussed herein may be utilized for mobile computing devices applied in various fields, such as healthcare (e.g., for secure exchange of patient information such as for patient monitoring devices at various locations including, for example in a home environment and/or remotely, e.g., via cellular networks, wireless broadband networks, etc.), entertainment, education, telecommunication, mobile computing, fitness, etc. Healthcare applications may include institutional and telemedicine, for example. Yet another example is in personal medical networks where sensors on a body may send sensed medical data to an aggregation device (such as a computing device, including for example, a PDA (Personal Digital Assistant), mobile phone, MID (Mobile Internet Device), PC (Personal Computer), UMPC (Ultra Mobile PC), or other computing devices using wireless technology.

In embodiments, to prevent eavesdropping, tampering of the data being exchanged between two devices or even accidental reception of a nearby third device, the secure exchange of encryption keys is necessary before actual data communications can start. For example, in medical applications the secure association (device pairing) allows the user to ensure that each medical sensor talks to the desired aggregator, rather than to an aggregator in the house next door.

FIG. 1 illustrates a block diagram of a system 100, according to one embodiment. As shown, both devices (or communication endpoints) that are to be authenticated (e.g., devices 102 and 104) may include a radio (e.g., radios 110 and 112, respectively). Radios 110 and 112 may be for primary communications (e.g., through a wireless communication channel 120, which may or may not be secured, for example, encrypted). Also, a wired channel may be used for primary communications between devices 102 and 104 in some embodiments. Device 104 may also include a signal generator 116 (such as a mechanical actuator, a wireless transducer, an NFC tag etc.) to generate signals that are detected by a sensor 114 (such as an accelerometer capable of sensing motion (e.g., in multiple axis, such as three axis in an embodiment), NFC reader etc.). More than one signal generator and/or sensor per device may be used in some embodiments.

As shown, the signal generator 116 may be coupled to the sensor 114 via an OOB communication channel 118 (e.g., to communicate authentication or secure association signals or data). Moreover, the OOB communication channel 118 may be a one-way channel in some embodiments, e.g., as demonstrated by the direction of corresponding arrow in FIG. 1. In embodiments, although the OOB channel 118 is tamperproof, it may not be private. Also, the wireless communication channel 120 may be bidirectional in some embodiments, e.g., as demonstrated by the direction of corresponding arrow in FIG. 1. As is further illustrated in FIG. 1, each of the devices 102 and 104 may also include a device association logic (e.g., logics 106 and 108, respectively) to perform various operations, as will be further discussed herein.

In an embodiment, the signal generator 116 may be a vibrator and the sensor 114 may be an accelerometer. Aside from this combination, other possible pairs of signal generators, and sensors could respectively include one or more of: (a) blinking LEDs (Light Emitting Diodes) or a display screen and an image capture device (such as a camera); or (b) speaker and a microphone; or (c) NFC tag and reader. Such combinations may provide tamper-free communication without adding a significant extra cost to the system (e.g., since such features may already be present in some mobile devices for other applications). For example, most cell phones and PDAs may have vibrators and cameras built-in. Also, many peripheral devices used for healthcare applications or entertainment may include accelerometers and/or LEDs.

Figure 2:
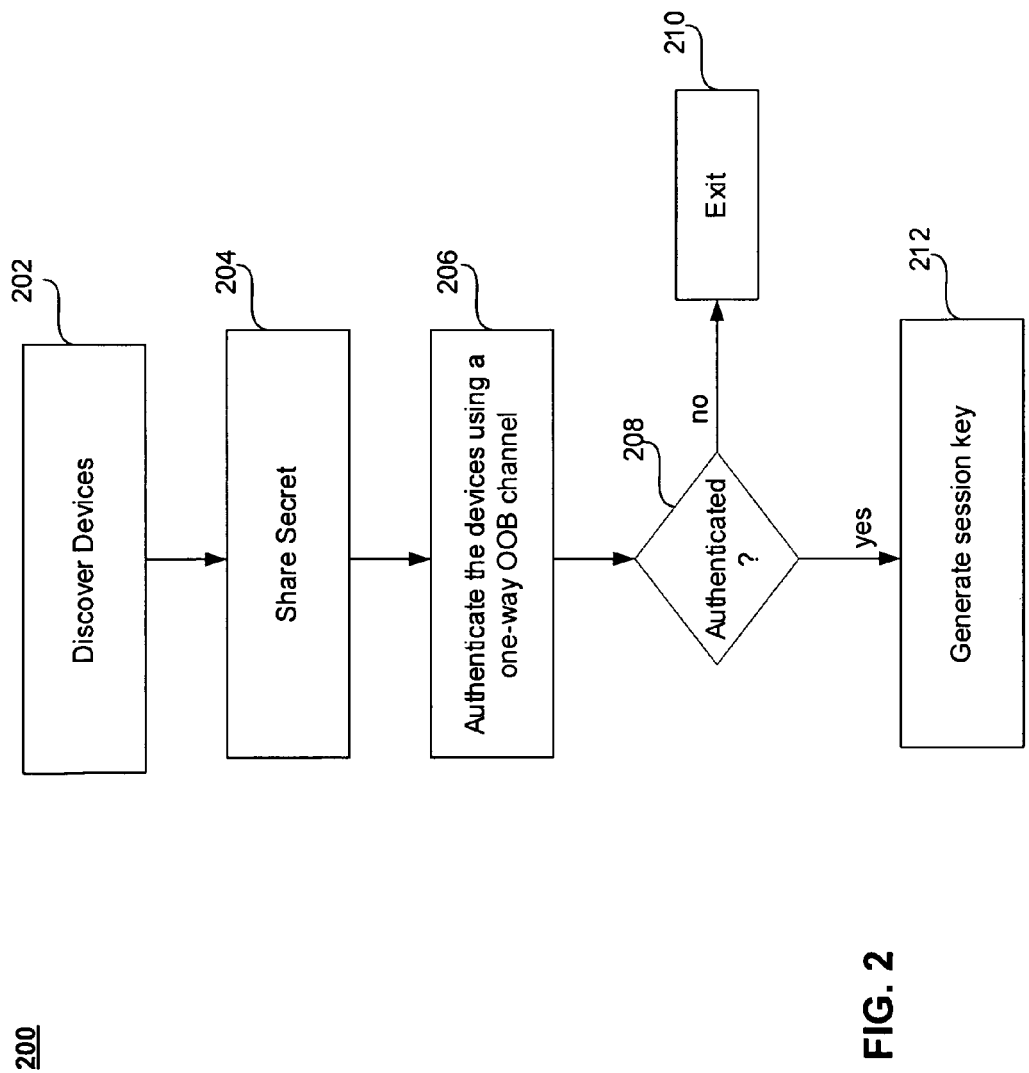
FIG. 2 illustrates an embodiment of a logic flow.

FIG. 2 illustrates a flow diagram of a method 200 to perform two-way authentication between two communication endpoints or devices using a one-way OOB channel, according to an embodiment. Various components discussed herein, e.g., with reference to FIG. 1 may be utilized to perform one or more of the operations of FIG. 2.

Referring to FIGS. 1 and 2, at a block 202, two devices that are to be authenticated (e.g., devices 102 and 104) discover each other and exchange information (e.g., logics 106 and 108 may cause exchange of information via the wireless communication channel 120) about their capabilities so that the association process may be started. At a block 204, a shared secret may be exchanged securely with the other device (e.g., logics 106 and 108 may utilize the Diffie-Hellman algorithm or a similar technique). In an embodiment, the shared secret may be communicated via the wireless communication channel 120.

At a block 206, two-way authentication between the two devices is performed using a one-way out-of-band (OOB) channel (e.g., OOB channel 118). At a block 208, it is determined whether the two devices are authenticated. If so, then at a block 212, using the data exchanged at operations 204 and 206, both devices may generate identical symmetric encryption keys to encrypt any communication between them from that point onwards (e.g., over the wireless communication channel 120). Otherwise, at a block 208 if it determined that either of the devices is not authenticated (e.g., possible man-in-the-middle attacker exists), the flow exits at block 210.

A more detailed embodiment of how the two-way authentication between the two devices is performed using a one-way OOB channel is described next with reference to FIGS. 3 and 4. In embodiments, a two-way wireless channel exists between Devices A and B. In addition, a one-way and tamper-proof OOB channel exists in the direction from Device B to Device A. The OOB channel may or may not be private. This is provided for illustration purposes and is not meant to limit the invention.

Embodiments of such techniques described herein may be integrated into existing secure association methods for wireless devices (such as Bluetooth Core Specification Version 2.1 (Bluetooth SIG, Aug. 1, 2007) or Wi-Fi Protected Setup (Wi-Fi Alliance, Jan. 8, 2007)).

Figure 3:
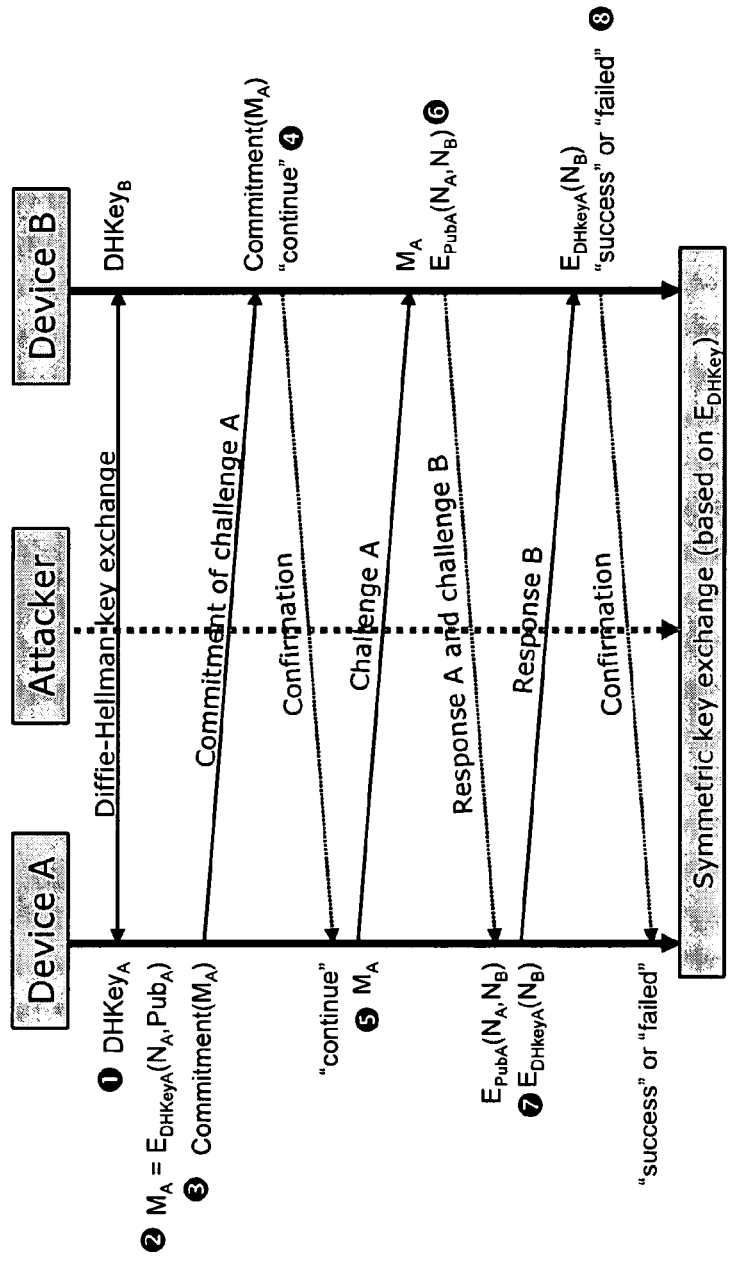
FIG. 3 illustrates an embodiment of a data flow.
Figure 4:
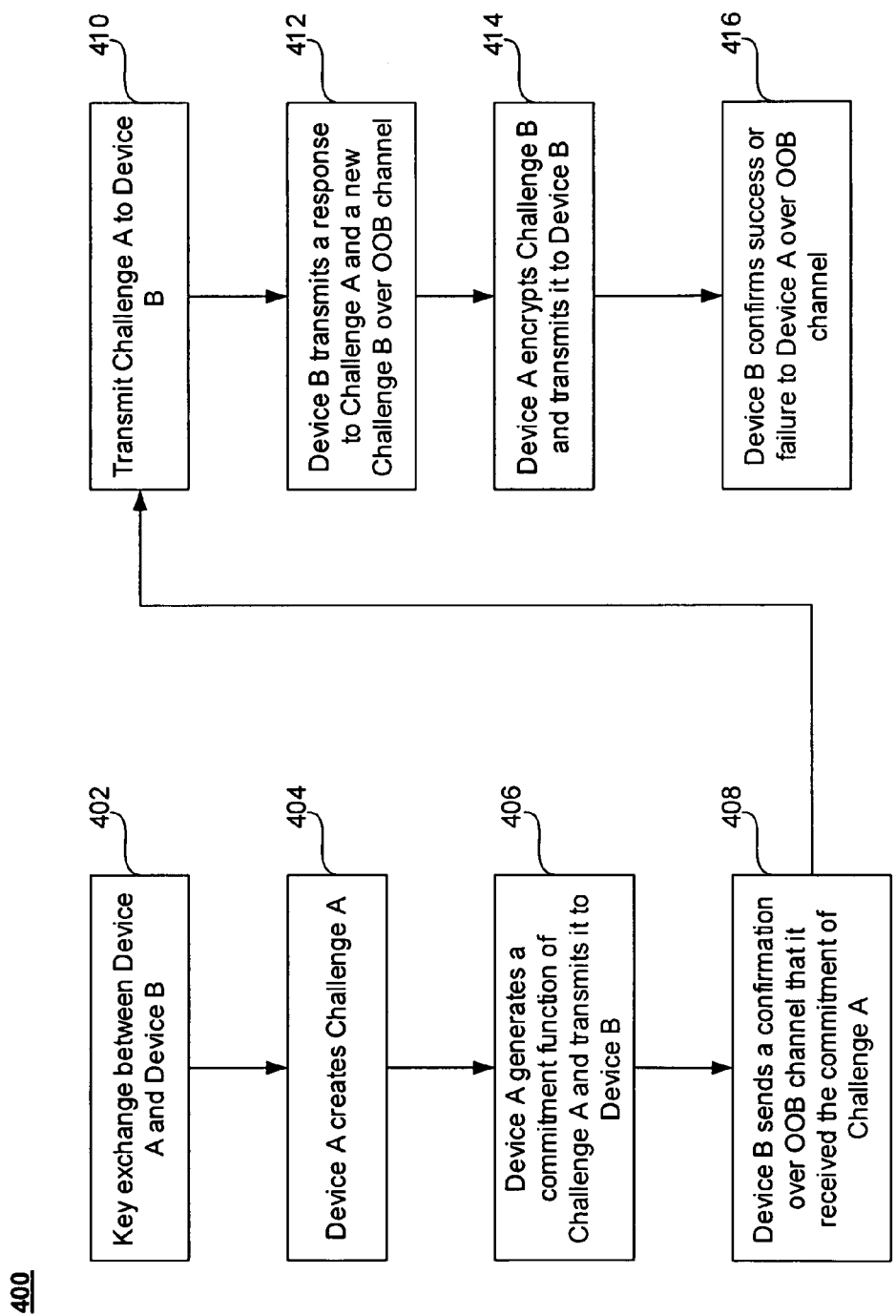
FIG. 4 illustrates an embodiment of a logic flow.

Referring to FIGS. 3 and 4, at a block 402 in method 400, a secret key (DHKey) may be exchanged securely between Devices A and B using the Diffie-Hellman algorithm or a similar technique. Note that although embodiments of the invention are described with reference to the Diffie-Hellman algorithm, the invention is not limited to this. In an embodiment, the shared secret may be communicated via a wireless communication channel (such as wireless channel 120).

Here, for example, the secret key DHKey is not known to any other device or communication endpoint. However, the Diffie-Hellman algorithm or protocol is susceptible to a man-in-the-middle attack in which each of the two devices wishing to pair may instead associate with a third device (i.e., the man-in-the-middle attacker) without realizing it. Note that an attacker between Device A and B can cause Device A to establish $DHKey_A$ with the attacker and Device B to establish $DHKey_B$ with the attacker (where $DHKey_A$ is different from $DHKey_B$).

At a block 404, Device A creates a Challenge A ($M_A = E_{DHKeyA}(N_A, Pub_A)$). In embodiments, Device A generates a public and private key pair ($Pub_A$ and $Pvt_A$). The key pair may be generated on-the-fly or offline. Device A generates a random number $N_A$, appends its public key $Pub_A$ and encodes the resulting value using $DHKey_A$. The resultant value is $M_A$ (i.e., Challenge A). In embodiments, Challenge A is not transmitted yet.

At a block 406, Device A generates a commitment function of Challenge A (i.e., Commitment ($M_A$)) and transmits it to Device B. In embodiments, Device A uses a one-way hash to generate the commitment function of $M_A$. Device A then transmits this value to Device B via the wireless channel. Note that an attacker could modify this value.

At a block 408, Device B sends a confirmation over the one-way OOB channel that it received the commitment of Challenge A. Here, note that an attacker cannot modify this confirmation or message or generate its own confirmation because the OOB channel is tamper-proof. Thus, if the attacker is going to modify the commitment value of Challenge A sent in block 406, the attacker must do so before this point.

At a block 410, Device A transmits Challenge A (i.e., $M_A$) to Device B over the wireless channel. Here, Device B checks to see if the received value matches the commitment function sent in block 406.

Note that if there is no attacker, Device B should be able to decrypt the packet using $DHKey_B$ (since in this case $DHKey_A = DHKey_B$) and obtain authentic copies of $N_A$ and $Pub_A$. If there is an attacker, then one of two cases is likely to be true. The first case is where the attacker did not modify Challenge A. Here, Device B cannot decrypt the values of $N_A$ and $Pub_A$ correctly since $DHKey_A$ does not equal $DHKey_B$ (due to the property of the Diffie-Hellman protocol when a man-in-the-middle attacker is present). Here, in embodiments, Device B exits the procedure immediately. The second case is where the attacker did modify Challenge A. In this case, because the attacker had to modify the commitment prior to block 408, the attacker was forced to do so prior to seeing the message. Thus, in embodiments, Device B will detect that the message does not match the commitment and exits the procedure immediately.

In a block 412, Device B transmits a response to Challenge A and a new Challenge B over the OOB channel. Note that from block 410, Device B has authentic copies of $N_A$ and $Pub_A$. Device B sends back the value $N_A$ to Device A as the response to Device A's challenge. Device B generates a random number $N_B$ (i.e., Challenge B). Device B encrypts $N_A$ and $N_B$ with $Pub_A$ and sends the resulting value over the OOB channel to Device A. Note that the privacy of $N_B$ is protected via public/private key encryption, so that the OOB channel need not be private. In embodiments, only Device A will be able to decrypt this message.

When Device A receives the response to Challenge A and the new Challenge B, Device A decrypts $N_A$ and $N_B$ from the message sent by Device B using its private key $Pvt_A$ (generated in block 404). In embodiments, Device A knows this message is from Device B because it was received over the OOB channel.

Device A then checks to see if Device B sent the correct value of $N_A$. Here, one of two cases can occur. In the first case, $N_A$ matches and thus Device A determines that the correct value of $N_A$ was sent. Here, Device A can confirm that Device B correctly received its message in block 410. Device A also can confirm that Device B was able to correctly decode $N_A$ and thus it has the correct value of DHKey (i.e., $DHKey_A = DHKey_B$). Device A now has authenticated Device B as the identity of the other end of the communication channel (i.e., the other holder of DHKey). In the second case, $N_A$ does not match and Device A can confirm that authentication failed in block 410 and exits the procedure.

In a block 414, Device A encrypts Challenge B (i.e., $N_B$) and transmits it to Device B over the wireless channel. Here, Device A encrypts $N_B$ with $DHKey_A$ (which Device A knows is the same as $DHKey_B$ since Device A has already authenticated Device B) and sends it over the wireless channel. Note that Device A can confirm that there is no attacker (from the response to Challenge A in block 412) and that only Device B can decrypt or modify this message.

In a block 416, Device B confirms success or failure to Device A over the OOB channel. When Device B decrypts the received message from Device A using its key $DHKey_B$, two cases can occur. In the first case, the received message matches Challenge B (i.e., $N_B$). Here, Device B has now authenticated Device A as the identity of the other end of the communication channel (i.e., the other holder of DHKey). Device B can now confirm success to Device A over the OOB channel. In the second case, the received message does not match Challenge B. Here, Device B confirms failure to Device A over the OOB channel and exits the procedure.

As described above, once Devices A and B are authenticated, both devices may generate identical symmetric encryption keys (based on DHKey) to encrypt any communication between them from that point onwards over the wireless channel.

As described above, Device A is limited to issuing a challenge to Device B over the wireless channel (or radio) since it cannot send data over the OOB channel. However, Device B can send a response over the OOB channel which would confirm its identity. The challenge issued by Device A is a random number that is encrypted with the key obtained during the Diffie-Hellman exchange (i.e., DHKey). However, consider a device that is attempting a man-in-the-middle attack and has exchanged Diffie-Hellman keys with both Device A and Device B. The malicious device could potentially receive the random number from Device A, decrypt it, and send it to Device B along with its own public key. In other words, it would modify the challenge issued by Device A in such a way that Device B could respond with the "right" value (i.e., $N_A$) that Device A expects.

To prevent the malicious device from such an attack, embodiments of the invention use a commitment function. In embodiments, commitment functions are one-way hash functions that "commit" a device to a particular value without revealing the actual value. Since Device B has to send a confirmation message over the OOB channel once Device A sends the result of a commitment function, the malicious device cannot change the commitment value since it does not know the actual value. Once Device A receives the confirmation message, it can actually send the challenge to Device B. The malicious device has no way to modify the challenge since the commitment value has already been sent. Thus this ensures that Device B gets the value $M_A$ as intended by Device A. Now it can respond with the correct value (i.e., $N_A$) only if it were the same device that performed the Diffie-Hellman exchange with Device A earlier. Sending the response via the OOB channel rather than the wireless channel confirms the legitimacy of Device B to Device A. Additionally Device B gets the public key of Device A (i.e., $Pub_A$) so that it can send its challenge securely in the next step.

In contrast to Challenge A, Device B can use the OOB channel to issue a challenge to Device A while preventing a malicious device from modifying the challenge. Note that in embodiments it was assumed that the OOB channel is tamper-proof but not private. Hence, Challenge B is encrypted using the public key of A (i.e., $Pub_A$) obtained in the previous step. The challenge issued by Device B is a random number (i.e., $N_B$) that Device A is supposed to send back over the wireless channel. At this point Device A has already verified that Device B is authentic and that there was no man-in-the-middle attacker (or malicious device) during the Diffie-Hellman exchange. Thus, using DHKey to encrypt data is secure. To prove its identity, Device A is supposed to send the value $N_B$ encrypted with DHKey to Device B. Once Device B receives this, it knows that Device A was the device with which it performed the Diffie-Hellman key exchange. The confirmation that the response was correct is sent over the OOB channel to prevent any malicious device from sending a wrong "confirmation" message over the wireless channel or radio. This completes the two-way authentication process over a tamper-proof one-way OOB channel.

Figure 5:
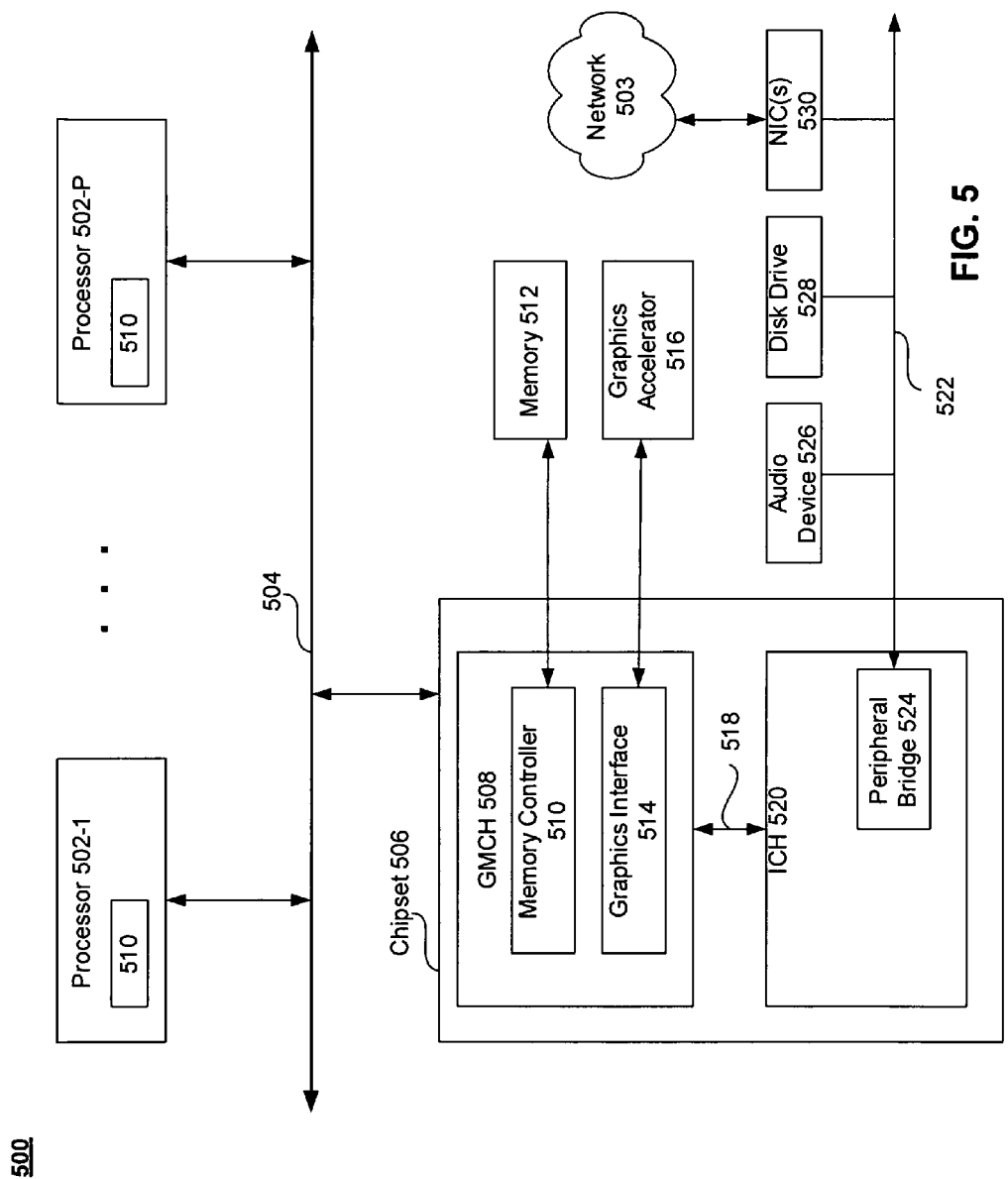
FIGS. 5 and 6 illustrate block diagram of embodiments of computing systems, which may be utilized to implement some embodiments discussed herein.

FIG. 5 illustrates a block diagram of a computing system 500 in accordance with an embodiment of the invention. The computing system 500 may include one or more central processing unit(s) (CPUs) or processors 502-1 through 502-P (which may be referred to herein as "processors 502" or "processor 502"). The processors 502 may communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, the operations discussed with reference to FIGS. 1-4 may be performed by one or more components of the system 500. For example, logics 106 and 108 may include a processor such as processors 502.

A chipset 506 may also communicate with the interconnection network 504. The chipset 506 may include a graphics memory control hub (GMCH) 508. The GMCH 508 may include a memory controller 510 that communicates with a memory 512. The memory 512 may store data, including sequences of instructions that are executed by the processor 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a graphics accelerator 516. In one embodiment of the invention, the graphics interface 514 may communicate with the graphics accelerator 516 via an accelerated graphics port (AGP). In an embodiment of the invention, a display (such as a flat panel display, a cathode ray tube (CRT), a projection screen, etc.) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the processor 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and one or more network interface device(s) 530 (which is in communication with the computer network 503). Other devices may communicate via the bus 522. Also, various components (such as the network interface device 530) may communicate with the GMCH 508 in some embodiments of the invention. In addition, the processor 502 and other components shown in FIG. 5 (including but not limited to the GMCH 508, one or more components of the GMCH 508 such as the memory controller 510, etc.) may be combined to form a single chip. Furthermore, a graphics accelerator may be included within the GMCH 508 in some embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration. For example, processors, memory, and/or input/output devices may be interconnected by a number of point-to-point interfaces.

Figure 6:
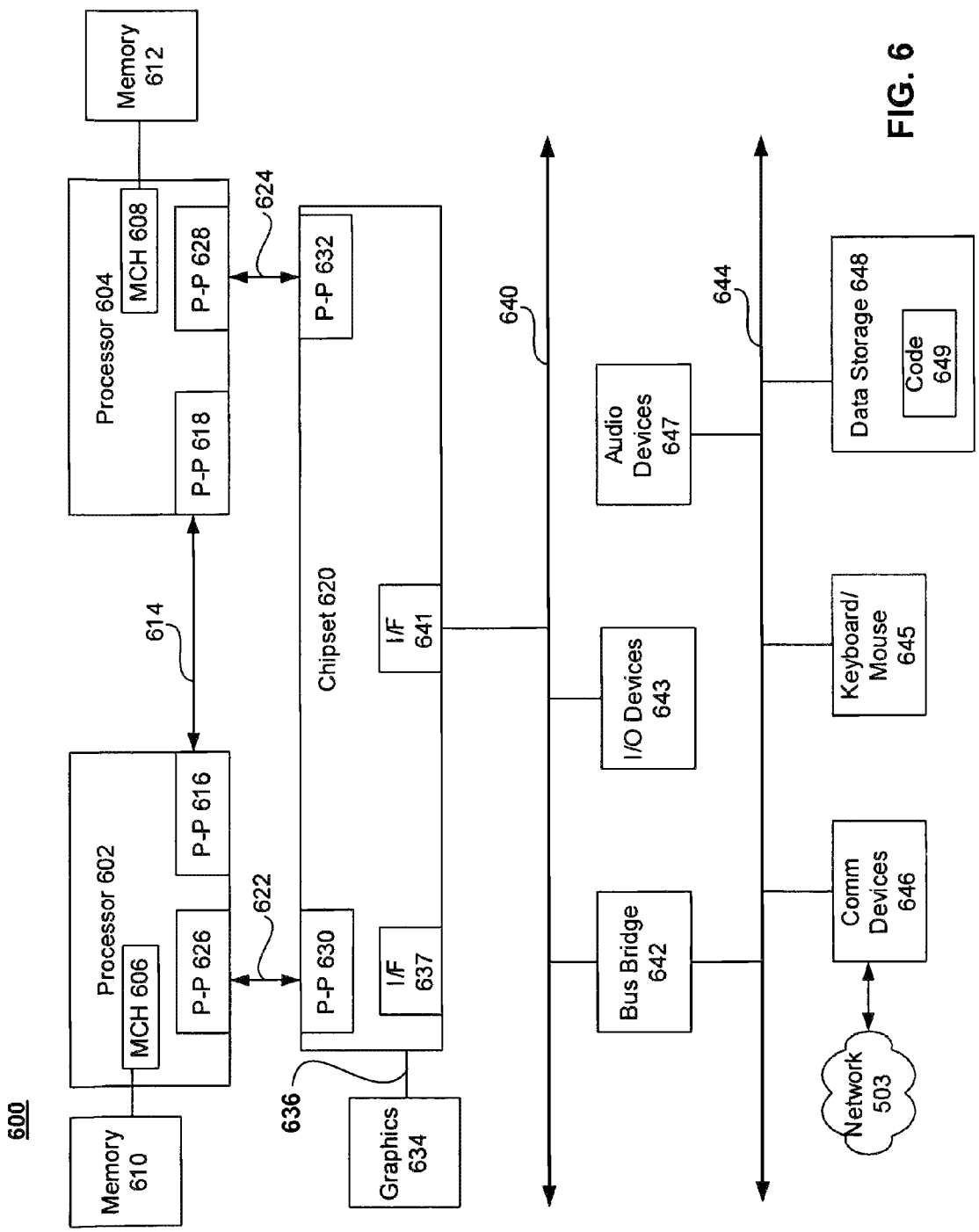

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention utilizes the processors 602 and 604 as one or more of the logics 106 and 108 of FIG. 1. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or any combinations thereof, which may be provided as a computer program product, e.g., including a machine-readable or computer-readable medium having stored thereon instructions (or software procedures) used to program a computer (e.g., including a processor) to perform a process discussed herein. The machine-readable medium may include a storage device such as those discussed herein.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
a device to form a one-way out-of-band (OOB) communication channel to communicate authentication signals between a first device and a second device, wherein the OOB communication channel is tamper-proof,
wherein the first device and the second device to exchange a key over a wireless communication channel;
wherein the first device to transmit a commitment of a first challenge over the wireless communication channel to the second device,
wherein the first device to receive confirmation over the OOB communication channel from the second device that it received the commitment of the first challenge,
wherein the first device to transmit the first challenge to the second device over the wireless communication channel,
wherein the first device to receive from the second device over the OOB communication channel a response to the first challenge and a second challenge, wherein the response to the first challenge is generated by using the exchanged key and wherein the response to the first challenge confirms the authenticity of the second device to the first device,
wherein the first device to use the exchanged key to encrypt the second challenge and to transmit the encrypted second challenge to the second device over the wireless communication channel, and
wherein the first device to receive confirmation from the second device over the OOB communication channel that the second device decrypted the second challenge with the exchanged key, wherein the confirmation of the decrypted second challenge confirms the authenticity of the first device to the second device.

2. The apparatus of claim 1, wherein the exchanged key is generated with the Diffie-Hellman algorithm.

3. The apparatus of claim 1, wherein the OOB communication channel is formed between a signal generator of the second device and a sensor of the first device.

4. The apparatus of claim 3, wherein the signal generator comprises an analog signal generator and the sensor comprises an analog sensor, wherein the OOB communication channel is to communicate analog authentication signals between the first device and the second device.

5. The apparatus of claim 1, wherein the wireless communication channel is to communicate wireless signals between the first device and the second device in response to an authentication between the first device and second device via the OOB communication channel.

6. The apparatus of claim 5, wherein the wireless communication channel comprises a non-secure wireless communication channel.

7. The apparatus of claim 5, wherein the wireless communication channel is to communicate one or more of: healthcare related data, entertainment related data, education related data, or telecommunication related data.

8. A method comprising:
forming a one-way out-of-band (OOB) communication channel to communicate authentication signals between a first device and a second device, wherein the OOB communication channel is tamper-proof;
exchanging a key over a wireless communication channel between the first and second devices;
transmitting, over the wireless communication channel by the first device to the second device, a commitment of a first challenge;
receiving, over the OOB communication channel by the first device from the second device, a confirmation that it received the commitment of the first challenge;
transmitting, over the wireless communication channel by the first device to the second device, the first challenge;
receiving, over the OOB communication channel by the first device from the second device, a response to the first challenge and a second challenge, wherein the response to the first challenge is generated by using the exchanged key, wherein the response to the first challenge confirms the authenticity of the second device to the first device;
using, by the first device, the exchanged key to encrypt the second challenge;

transmitting, over the wireless communication channel by the first device to the second device, the encrypted second challenge; and receiving, over the OOB communication channel by the first device from the second device, confirmation that the second device decrypted the second challenge with the exchanged key, wherein the confirmation of the decrypted second challenge confirms the authenticity of the first device to the second device.

9. The method of claim 8, wherein the exchanged key is generated with the Diffie-Hellman algorithm.

10. The method of claim 8, wherein the OOB communication channel is formed between a signal generator of the second device and a sensor of the first device.

11. The method of claim 10, wherein the signal generator comprises an analog signal generator and the sensor comprises an analog sensor, wherein the OOB communication channel is to communicate analog authentication signals between the first device and the second device.

12. The method of claim 8, wherein the wireless communication channel is to communicate wireless signals between the first device and the second device in response to an authentication between the first device and second device via the OOB communication channel.

13. The method of claim 12, wherein the wireless communication channel comprises a non-secure wireless communication channel.

14. The method of claim 12, wherein the wireless communication channel is to communicate one or more of: healthcare related data, entertainment related data, education related data, or telecommunication related data.

15. A computer-readable storage device comprising one or more instructions that when executed on a processor configure the processor to:

form a one-way out-of-band (OOB) communication channel to communicate authentication signals between a first device and a second device, wherein the OOB communication channel is tamper-proof;

exchange a key over a wireless communication channel between the first and second devices;

transmit, over the wireless communication channel by the first device to the second device, a commitment of a first challenge;

receive, over the OOB communication channel by the first device from the second device, a confirmation that it received the commitment of the first challenge;

transmit, over the wireless communication channel by the first device to the second device, the first challenge;

receive, over the OOB communication channel by the first device from the second device, a response to the first challenge and a second challenge, wherein the response to the first challenge is generated by using the exchanged key, wherein the response to the first challenge confirms the authenticity of the second device to the first device;

use, by the first device, the exchanged key to encrypt the second challenge;

transmit, over the wireless communication channel by the first device to the second device, the encrypted second challenge; and receive, over the OOB communication channel by the first device from the second device, confirmation that the second device decrypted the second challenge with the exchanged key, wherein the confirmation of the decrypted second challenge confirms the authenticity of the first device to the second device.

16. The computer-readable storage device of claim 15, wherein the exchanged key is generated with the Diffie-Hellman algorithm.

17. The computer-readable storage device of claim 15, wherein the OOB communication channel is formed between a signal generator of the second device and a sensor of the first device.

18. The computer-readable storage device of claim 17, wherein the signal generator comprises an analog signal generator and the sensor comprises an analog sensor, wherein the OOB communication channel is to communicate analog authentication signals between the first device and the second device.

19. The computer-readable storage device of claim 15, wherein the wireless communication channel is to communicate wireless signals between the first device and the second device in response to an authentication between the first device and second device via the OOB communication channel.

20. The computer-readable storage device of claim 15, wherein the wireless communication channel is to communicate one or more of: healthcare related data, entertainment related data, education related data, or telecommunication related data.

\* \* \* \* \*